United States Patent [19]

Rohde et al.

[11] Patent Number: 4,751,706

[45] Date of Patent: Jun. 14, 1988

[54] LASER FOR PROVIDING RAPID SEQUENCE OF DIFFERENT WAVELENGTHS

[75] Inventors: Robert S. Rohde, Alexandria; Jeffrey L. Ahl, Fairfax, both of Va.

[73] Assignee: The United States of America as represented by the Secretary of the Army, Washington, D.C.

[21] Appl. No.: 948,256

[22] Filed: Dec. 31, 1986

[51] Int. Cl.[4] .............................................. H01S 3/082
[52] U.S. Cl. ...................................... 372/23; 372/14; 372/20; 372/102; 372/103
[58] Field of Search ...................... 372/23, 20, 14, 102, 372/103

[56] References Cited

U.S. PATENT DOCUMENTS

| | | | |
|---|---|---|---|
| 3,561,869 | 2/1971 | Cason, III et al. | 372/12 |
| 4,287,486 | 9/1981 | Javan | 372/20 |
| 4,425,648 | 1/1984 | Holly | 372/20 |

FOREIGN PATENT DOCUMENTS 2843274  4/1979  Fed. Rep. of Germany ........ 372/23

OTHER PUBLICATIONS

Faxvog et al.; "Rapidly Tunable $CO_2$ Tea Laser"; Applied Optics, vol. 21, No. 22, Nov. 15, 1982; pp. 3986-3987.

Sheffield et al.; "An Independently-Locking"; Applied Physics Letters, vol. 29, No. 9, Nov. 1, 1976; pp. 558-590.

Primary Examiner—William L. Sikes
Assistant Examiner—Xuan T. Vo
Attorney, Agent, or Firm—Max L. Harwell; Aubrey J. Dunn; Anthony T. Lane

[57] ABSTRACT

The optical cavity of the present laser has a folded optical path with a pair of reflective diffraction gratings and a gain cell in it. A disk with radially distributed perforations rotates in the optical path between the gratings and the gain cell. The laser wavelength depends upon which perforation is aligned with the slot in a slotted plate also in the optical path. The laser output consists of a sequence of different wavelength but colinear rays.

2 Claims, 1 Drawing Sheet

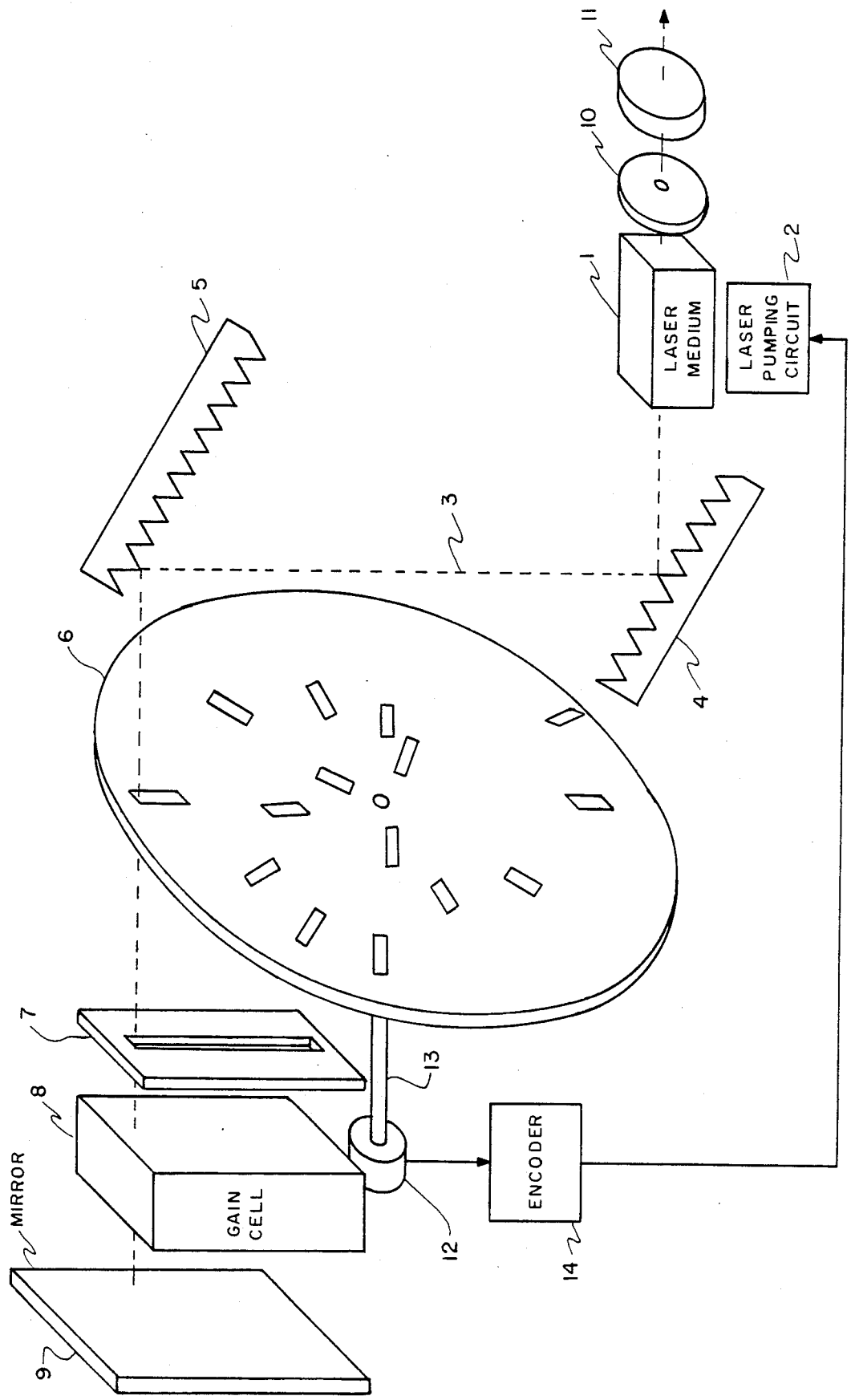

LASER FOR PROVIDING RAPID SEQUENCE OF DIFFERENT WAVELENGTHS

The invention described herein may be manufactured, used, and licensed by the U.S. Government for governmental purposes without the payment of any royalties thereon.

BACKGROUND OF THE INVENTION

This invention is in the field of lasers having selectable wavelengths.

A normal laser, because of its construction, is capable of having an output of a number of wavelengths about some nominal wavelength. Various techniques have been proposed for selecting a particular output wavelength. U.S. Pat. Nos. 3,928,817, 4,425,648, and 4,575,243 are exemplary of such techniques. Also, on pages 588–590 of *APPLIED PHYSICS LETTERS*, Vol. 29, No. 9 of Nov. 1, 1976 and on pages 3986 and 3987 of *APPLIED OPTICS*, Vol. 21, No. 22 of Nov. 15, 1982 we see more techniques. This invention arose because of a need for a laser capable of rapidly providing a colinear sequence of different wavelengths. Although some of the references above can provide rapid wavelength changes, and some provide colinear beams, none of them can provide both, with low jitter. The instant invention does.

SUMMARY OF THE INVENTION

This invention is a stable laser for providing a rapid sequence of different wavelength but colinear laser beams. It includes the usual laser active medium and pump for the medium. The optical cavity includes a pair or reflective diffraction gratings, a fully reflective and a partially reflective mirror, a gain cell and a rapidly rotating aperture disc between the gain cell and the gratings. The pump is operated in synchronism with the rotation of the disc.

BRIEF DESCRIPTION OF THE DRAWINGS

The single drawing FIGURE is a schematic showing of the invention.

DESCRIPTION OF PREFERRED EMBODIMENT OF INVENTION

The invention might be best understood when this description is taken in conjunction with the drawing. Referring now to the drawing, we see laser medium 1 which is pumped by circuit 2. The laser beam, whose path is indicated by dashed line 3, exits 1, is reflected from a pair of diffraction gratings 4 and 5, passes through an aperture in aperture wheel 6, through a slot in plate 7, through gain cell 8, and is retroreflected at mirror 9. The retroreflected beam retraces its path through laser medium 1, passes through iris 10, and is partially retroreflected by output mirror 11. Wheel 6 is driven by motor 12 turning shaft 13 on which the wheel is mounted. Encoder 14 is also operated by motor 12 and sends pulses to laser pumping circuit 2. This circuit applies pumping to the laser medium as each one of the perforations of wheel 6 aligns with the slot in plate 7. For each perforation in wheel 6, the laser beam follows a different path from diffraction grating 4 to mirror 9, but the output beams through 10 and 11 are all colinear. With the exception of wheel 6, plate 7, motor 12, shaft 13, encoder 14, and laser pumping circuit 2, the inventive laser is essentially the same as that described in the *APPLIED PHYSICS LETTERS* article referred to above. The additional elements of this invention, however, allow us to obtain a rapid sequence of colinear laser beams of different wavelengths, and with low jitter.

We claim:

1. A stable laser for providing a rapid sequence of laser beams of different wavelengths, including:
   a lasing medium;
   means for pumping said medium;
   an optical cavity having a laser beam optical path, including the series arrangement of:
   a partially transparent mirror,
   a pair of reflective diffraction gratings,
   a rotating aperture disc,
   a slotted plate,
   a fully reflective mirror, wherein the lasing medium is between the gratings and the partially transparent mirror;
   and an encoder responsive to the rotation of said disc and providing a signal to said means for pumping, whereby said means for pumping operates whenever an aperture of said disc is aligned with the slot in said slotted plate, wherein a laser beam exits said medium in response to pumping thereof, is reflected by one diffraction grating of said pair of reflective diffraction gratings to the other diffraction grating of said pair, is reflected by the other grating through an aperture in said disc and through said slot, is retroreflected by said fully reflective mirror back along the same path to and then through said lasing medium, and is partially retroreflected by said partially transparent mirror.

2. The laser as set forth in claim 1 wherein said disc is provided with a plurality of apertures individually radially spaced from an axis and is rotatable about said axis, and whereby said axis is parallel to the portion of said optical path between said other diffraction grating and said fully-reflective mirror, whereby the path of said ray, between said one diffractive grating and said fully-reflective mirror, and consequently the laser wavelength, is determined by the aperture through which the ray passes, as determined by the rotational position of said disc.

* * * * *